United States Patent
Kim

(10) Patent No.: US 10,461,307 B2
(45) Date of Patent: Oct. 29, 2019

(54) DEVICE FOR PROTECTING RECHARGEABLE BATTERY

(71) Applicant: Samsung SDI Co., Ltd., Yongin-si, Gyeonggi-do (KR)

(72) Inventor: Duk-Jung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 202 days.

(21) Appl. No.: 15/623,245

(22) Filed: Jun. 14, 2017

(65) Prior Publication Data

US 2018/0062149 A1    Mar. 1, 2018

(30) Foreign Application Priority Data

Sep. 1, 2016 (KR) .......... 10-2016-0112718

(51) Int. Cl.
*H01M 2/34* (2006.01)

(52) U.S. Cl.
CPC .......... *H01M 2/345* (2013.01); *H01M 2/347* (2013.01); *H01M 2/348* (2013.01); *H01M 2200/103* (2013.01); *H01M 2200/20* (2013.01); *H01M 2220/20* (2013.01)

(58) Field of Classification Search
CPC ...... H01M 2/345; H01M 2/347; H01M 2/348; H01M 10/44; H01M 10/425; H01M 10/445
See application file for complete search history.

(56) References Cited

U.S. PATENT DOCUMENTS

| 5,747,966 A | * | 5/1998 | Minamoto | H02J 7/0024 320/124 |
| 6,239,579 B1 | * | 5/2001 | Dunn | H02J 7/0019 320/121 |
| 6,923,279 B2 | * | 8/2005 | Shimane | B60K 6/28 180/65.1 |
| 2001/0054877 A1 | * | 12/2001 | Kinoshita | H02J 7/0014 320/112 |
| 2013/0149572 A1 | * | 6/2013 | Matsuo | H01M 2/34 429/61 |

FOREIGN PATENT DOCUMENTS

| JP | 2014-35807 A |   | 2/2014 |
| JP | 2015125993 A | * | 7/2015 |
| KR | 10-1500229 B1 |   | 3/2015 |

* cited by examiner

*Primary Examiner* — Gregg Cantelmo
(74) *Attorney, Agent, or Firm* — Lewis Roca Rothgerber Christie LLP

(57) ABSTRACT

Embodiments of the present invention relate to a device for protecting a rechargeable battery including a plurality of unit cells contained in a module case and coupled in series between a first module electrode terminal and a second module electrode terminal, a plurality of bypass switches separated from the plurality of unit cells, electrically connected to each other, and configured to physically contact a first electrode terminal of a respective one of the unit cells according to an internal pressure thereof, and a plurality of bypass fuses for connecting adjacent ones of the plurality of unit cells, and for connecting a last unit cell of the plurality of unit cells and the second module electrode terminal, respectively.

8 Claims, 4 Drawing Sheets

DEVICE FOR PROTECTING RECHARGEABLE BATTERY

CROSS-REFERENCE TO RELATED APPLICATION

This application claims priority to, and the benefit of, Korean Patent Application No. 10-2016-0112718 filed in the Korean Intellectual Property Office on Sep. 1, 2016, the entire contents of which are incorporated herein by reference.

BACKGROUND

1. Field

Embodiments of the present invention relate to a device for protecting a rechargeable battery.

2. Description of the Related Art

A rechargeable battery, differing from a primary battery, can be repeatedly charged and discharged, and a nickel-hydrogen battery, a lithium battery, and a lithium-ion battery are types of the rechargeable battery. A low capacity rechargeable battery may be used for portable small electronic devices, such as a mobile phone, a laptop computer, and a camcorder, and a large capacity rechargeable battery may be used as a power source for driving a motor, such as a hybrid vehicle or an electric vehicle.

Here, the electric vehicle receives electrical energy from an external device to charge the rechargeable battery, and acquires power that is mechanical energy through a motor connected to wheels of the vehicle with a voltage charged in the rechargeable battery. The electric vehicle includes various protection devices to ensure safety of the user and the vehicle. For example, physical means, such as a fuse for ensuring safety from a high-voltage short circuit that may be generated when connected to an external rechargeable battery, or a controller for preventing generation of heat by an overcharging in the rechargeable battery, may be used as the protection devices.

In general, when much heat is generated in the rechargeable battery, or when an electrolyte solution is decomposed, an internal pressure may increase to generate fire or to cause explosion. Particularly, when the physical means or the controller generate a defect to cause the continuous overcharge the rechargeable battery, the rechargeable battery may combust to result in a fire.

The above information is only for enhancement of understanding of the background of the invention, and therefore may contain information that does not form the prior art.

SUMMARY

Embodiments of the present invention provide a device for protecting a rechargeable battery for improving safety by preventing generation of fire caused by continuously overcharging a battery.

An embodiment of the present invention provides a device for protecting a rechargeable battery including a plurality of unit cells contained in a module case and coupled in series between a first module electrode terminal and a second module electrode terminal, a plurality of bypass switches separated from the plurality of unit cells, electrically connected to each other, and configured to physically contact a first electrode terminal of a respective one of the unit cells according to an internal pressure thereof, and a plurality of bypass fuses for connecting adjacent ones of the plurality of unit cells, and for connecting a last unit cell of the plurality of unit cells and the second module electrode terminal, respectively.

The plurality of unit cells may respectively include a battery assembly, the first electrode terminal connected to a first electrode of the battery assembly, a second electrode terminal connected to a second electrode of the battery assembly, and a case for receiving the battery assembly.

The plurality of bypass switches may respectively include a first connector on the case, having a same polarity as the first electrode terminal, and configured to be physically transformed according to an internal pressure of the case, a second connector configured to form an electrical connection with the first connector, and having resistance that is configured to vary according to an internal temperature of the case, and a third connector for connecting the second connector to an adjacent bypass switch.

The second connector may include an element of which resistance is configured to decrease when the internal temperature rises, and is configured to increase when the internal temperature falls.

The third connector of the bypass switch corresponding to the last unit cell from among the plurality of bypass switches may be connected to the second module electrode terminal.

The plurality of bypass switches may be configured to respectively electrically connect the first electrode terminals of two of the unit cells according to the internal pressures of the two of the unit cells to form an electrical connection.

The plurality of bypass fuses may be configured to be respectively opened by a current due to the electrical connection.

The device may further include a bypass switch configured to be transformed according to an internal pressure of the module case to generate an electrical connection between the first and second module electrode terminals.

When the internal pressure increases by an abnormal overcharging of the unit cell or the battery module configuring the battery, embodiments of the present invention provide the physical wire as an electrical node with the unit cell or the battery module after a mechanical transformation for bypassing the unit cell or the battery module through the electrical node, thereby preventing generation of fire caused by a continuous overcharging, and thereby improving the safety.

Further, by forming the bypass wire including a resistor with resistance that varies with the internal temperature of the unit cell, the charging current of other unit cells are not bypassed to delay overcharging, and a resistor is disposed on the node between the unit cell or the battery module and the bypass wire to prevent generation of heat by an arc.

DETAILED DESCRIPTION

Figure 1:
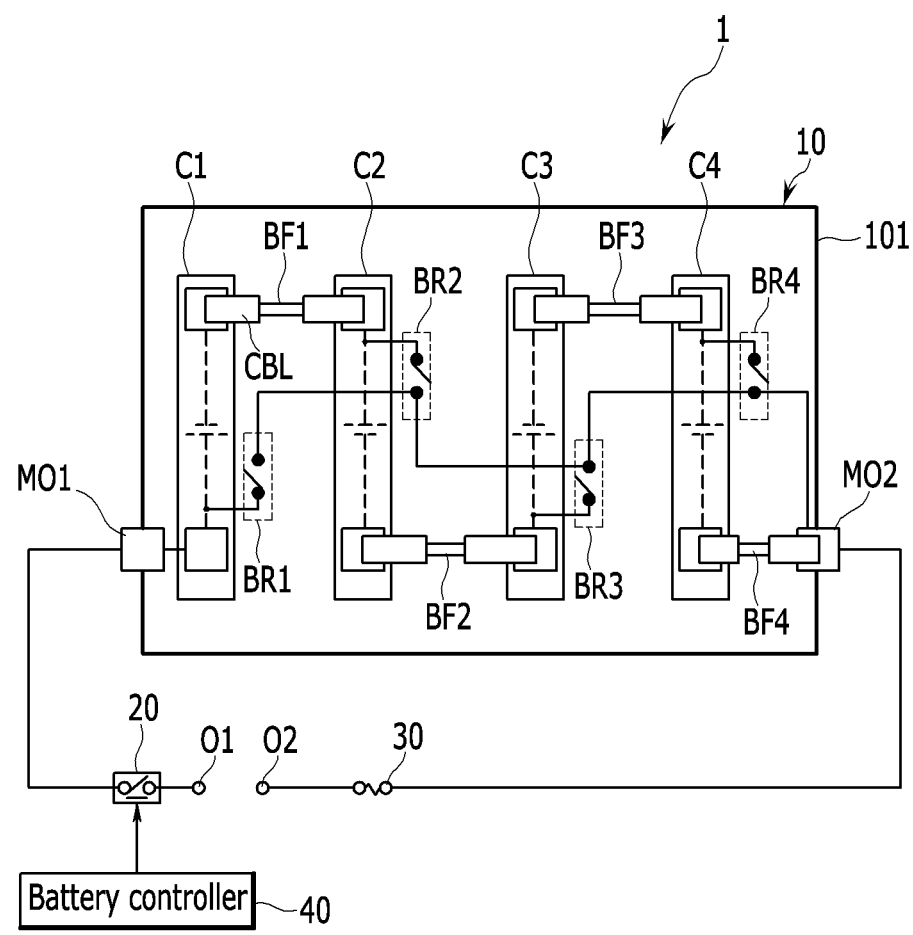
FIG. 1 shows a circuit diagram of a device for protecting a rechargeable battery according to a first embodiment.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of embodiments of the present invention to those skilled in the art. Accordingly, processes, elements, and techniques that are not necessary to those having ordinary skill in the art for a complete understanding of the aspects and features of embodiments of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the embodiments of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 shows a circuit diagram of a device for protecting a rechargeable battery according to a first embodiment.

Referring to FIG. 1, the device for protecting a rechargeable battery 1 according to a first embodiment includes a battery module 10, a main relay 20, a main fuse 30, and a battery controller 40. The battery module 10 is charged when connected to a charger through an external positive terminal O1 and an external negative terminal O2, and the battery module 10 is discharged when connected to an external load through the external positive terminal O1 and the external negative terminal O2.

The battery module 10 includes first to fourth unit cells (C1 to C4), and a protection device contained in a module case 101. A positive terminal of the first unit cell C1 is connected to a module positive terminal MO1, and a negative terminal of the fourth unit cell C4 is connected to a module negative terminal MO2. The module positive and negative terminals MO1 and MO2 may be referred to as first and second module electrode terminals.

A positive terminal of one of the first to fourth unit cells (C1 to C4) may be connected to a negative terminal of the adjacent unit cell through a cell bus bar (CBL). In the present embodiment, there are four unit cells C1 to C4 for configuring the battery module 10, although the present invention is not limited thereto.

The main relay 20 is controlled by the battery controller 40 to selectively connect a current path between the charger and the battery module 10. The main fuse 30 is melted when an overcurrent flows to the current path between the charger and the battery module 10.

The battery controller 40 controls charging and discharging of the battery module 10 to prevent overcharging or over-discharging of the battery module 10. For example, when the battery module 10 is overcharged in a charging mode, the battery controller 40 turns off the main relay 20 to intercept or block the current flowing to the battery module 10 from the charger.

However, in the charging mode, an overcharged state of the battery module 10 may continue because of factors, such as a control failure of the battery controller 40, a defect of the main fuse 30, or degradation or short-circuit of at least one of the first to fourth unit cells (C1 to C4).

The present embodiment assumes that the battery module 10 continues to be overcharged to thereby increase internal pressures of at least two of the first to fourth unit cells (C1 to C4), and that the battery module 10 provides a protection device for delaying and stopping the overcharged state of the battery module 10 when at least two of the first to fourth unit cells (C1 to C4) are mechanically transformed by the internal pressures (e.g., transformed to cause a bulge).

Here, the protection device include first to fourth bypass switches (BR1 to BR4) and first to fourth bypass fuses (BF1 to BF4). When at least two of the first to fourth unit cells (C1 to C4) are abnormally overcharged to increase the internal pressures, the first to fourth bypass switches (BR1 to BR4) form a bypass wire with electrical resistance (e.g., an electrical connection) between positive terminals of the two unit cells.

The first to fourth bypass switches (BR1 to BR4) are correspond to the first to fourth unit cells (C1 to C4), respectively, and are electrically connected thereto. The first to fourth bypass switches (BR1 to BR4) respectively form an electrical node with the positive terminal of the corresponding unit cell by overcharging.

In detail, when the internal pressure increases due to an overcharging of the first unit cell C1, the first bypass switch BR1 forms an electrical wire between the positive terminal of the first unit cell C1 and the second bypass switch BR2. When the internal pressure increases by the overcharging of the second unit cell C2, the second bypass switch BR2 forms an electrical wire between the positive terminal of the second unit cell C2 and the first and third bypass switches BR1 and BR3.

When the internal pressure increases by an overcharging of the third unit cell C3, the third bypass switch BR3 forms an electrical wire between the positive terminal of the third unit cell C3 and the second and fourth bypass switches BR2 and BR4. When the internal pressure increases by an overcharging of the fourth unit cell C4, the fourth bypass switch BR4 forms an electrical wire between the positive terminal of the fourth unit cell C4, and the third bypass switch BR3 and the module negative terminal MO2.

When a bypass wire is generated by the first to fourth bypass switches (BR1 to BR4), the first to fourth bypass fuses (BF1 to BF4) are opened by a short-circuit current flowing through the bypass wire. Here, the first bypass fuse BF1 is provided between the negative terminal of the first unit cell C1 and the positive terminal of the second unit cell C2. The second bypass fuse BF2 is provided between the negative terminal of the second unit cell C2 and the positive terminal of the third unit cell C3.

The third bypass fuse BF3 is provided between the negative terminal of the third unit cell C3 and the positive terminal of the fourth unit cell C4. The fourth bypass fuse BF4 is provided between the negative terminal of the fourth unit cell C4 and the module negative terminal MO2.

A connection relationship between the first to fourth bypass switches (BR1 to BR4) and the first to fourth bypass fuses (BF1 to BF4), and a protection operation, will now be described in detail with reference to FIG. 2 and FIG. 3.

Figure 2:
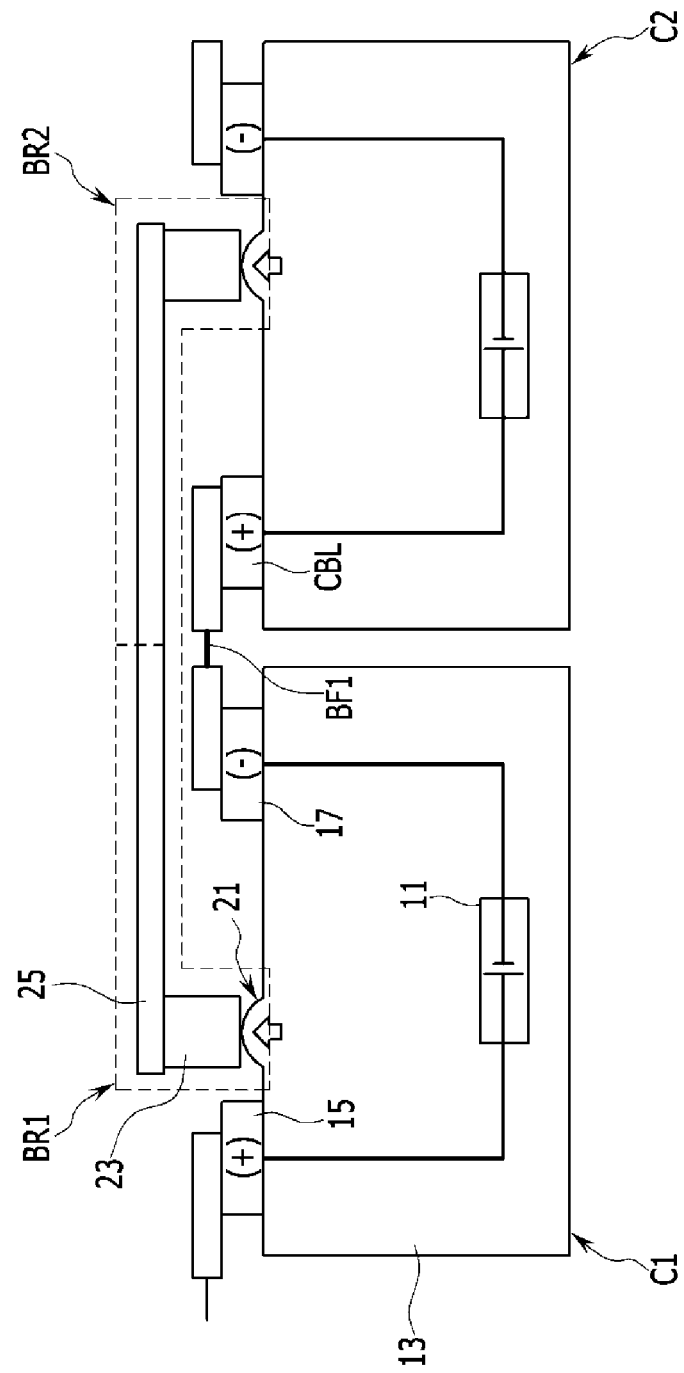
FIG. 2 shows a schematic diagram for showing a first unit cell, a second unit cell, a first bypass switch, a second bypass switch, and a first bypass fuse shown in FIG. 1.
Figure 3:
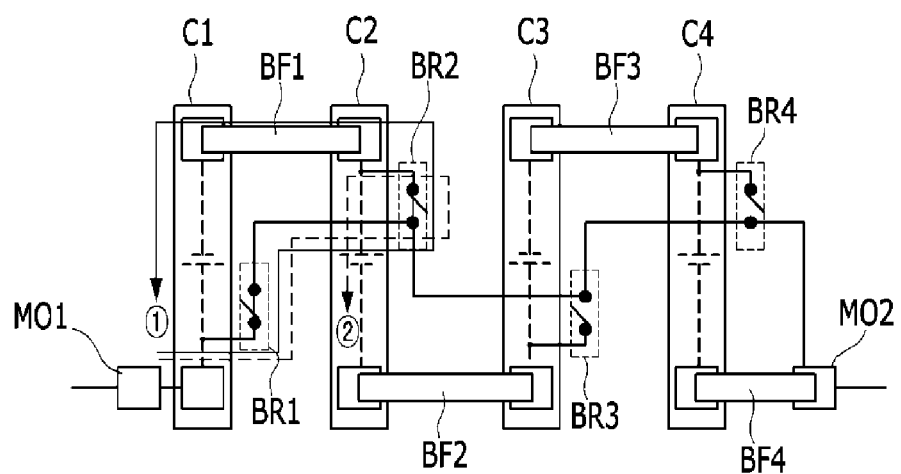
FIG. 3 shows a circuit diagram of a battery module shown in FIG. 1.

FIG. 2 shows a schematic diagram for showing a first unit cell C1, a second unit cell C2, a first bypass switch BR1, a second bypass switch BR2, and a first bypass fuse BF1, which are shown in FIG. 1, and FIG. 3 shows a circuit diagram of a battery module 10 shown in FIG. 1. FIG. 2 and FIG. 3 show a case in which the internal pressure increases by an abnormal overcharging of the first and second unit cells C1 and C2.

Referring to FIG. 2, the first and second unit cells C1 and C2 are disposed in one direction and spaced apart (e.g., with a predetermined interval). The first unit cell C1 includes a battery assembly/electrode assembly 11, a case 13, and a positive terminal 15 and a negative terminal 17 (e.g., a first electrode terminal and a second electrode terminal 15 and 17). The electrode assembly 11 may include a configuration in which a positive electrode plate and a negative electrode plate (e.g., a first electrode and a second electrode) are on respective sides of a separator with the separator provided therebetween.

The case 13 receives the electrode assembly 11. The case 13 may be made of a metal, such as aluminum or stainless steel, and may be formed to be a rectangle. The present invention is not limited to this, and a material and a shape of the case 13 are modifiable. Respective configurations of the second to fourth unit cells (C2 to C4) correspond to that of the first unit cell C1, and repeated description thereof is omitted.

The first bypass switch BR1 includes a first connector 21, a second connector 23, and a third connector 25. When the internal pressure increases by an abnormal overcharging of the first unit cell C1, the first connector 21 is mechanically transformed to physically contact the second connector 23 (e.g., due to bulging of the first connector 21).

Here, the first connector 21 may have a same polarity as the positive terminal 15 of the first unit cell C1. For example, when the case 13 has a same polarity as the positive terminal 15, the first connector 21 may be integrally formed with the case 13. Accordingly, the first connector 21 may easily expand when compared to other regions of the case 13. That is, when the first connector 21 is transformed to be convex in an external direction of the case 13 due to internal pressure of the first unit cell C1, an electrical node of (e.g., electrical connection between) the positive terminal 15 of the first unit cell C1 and the second connector 23 is formed.

The present invention is not limited to this, and when the case 13 does not have a polarity, a first connector 21 extending from the positive terminal 15 may be separately provided in the case 13. In this case, the first connector 21 may be formed to be convex in an internal direction of the case 13, and it may be formed such that its shape may be inverted by the internal pressure of the case 13.

The second connector 23 is provided to be separated from the first connector 21 (e.g., separated by a predetermined gap), and is configured act as an electrical resistor with resistance that is variable corresponding to a temperature of the first unit cell C1 (e.g., the second connector 23 may be a thermistor). Here, the second connector 23 may include a negative thermal coefficient (NTC) element of which resistance increases when the temperature thereof rises, and of which resistance reduces when the temperature thereof falls.

The third connector 25 electrically connects the second connector 23 of the bypass switch BR1 and the third connector 25 of the adjacent bypass switch BR2.

Configurations of the second to fourth bypass switches (BR2 to BR4) correspond to that of the first bypass switch BR1, except that the third connector 25 of the fourth bypass switch BR4 is connected to the module negative terminal MO2 and not to the third connector of an adjacent bypass switch, which is shown in FIG. 3.

An operation for protecting overcharged states of the first and second unit cells C1 and C2 will now be described with reference to FIG. 2 and FIG. 3.

When the internal pressure of the first unit cell C1 increases by an overcharging, the first connector 21 is transformed to be convex in the external direction of the case 13 to physically contact the second connector 23 as indicated by an arrow shown in FIG. 2. When the internal pressure of the second unit cell C2 increases by an overcharging, the first connector 21 physically contacts the second connector 23 in a like manner of the first unit cell C1.

As shown in FIG. 3, a closed circuit for allowing a short-circuit current (①) to flow to the first bypass switch BR1, the second bypass switch BR2, the first bypass fuse BF1, and the negative terminal 17 of the first unit cell C1 from the positive terminal 15 of the first unit cell C1 is generated. That is, a bypass path including two switches coupled in series is generated between the positive terminal 15 of the first unit cell C1 and the positive terminal 15 of the second unit cell C2.

In this instance, resistance of the first and second bypass switches BR1 and BR2 are determined by internal temperatures of the first and second unit cells C1 and C2. When the first and second unit cells C1 and C2 are overcharged, the internal temperatures are higher than those of a normally charged state so the first and second bypass switches BR1 and BR2 have relatively low resistance. A big short-circuit current (①) flows to the closed circuit, and the first bypass fuse BF1 is opened.

A charging path for the charging current (②) to flow to the positive terminal 15 of the second unit cell C2 from the positive terminal 15 of the first unit cell C1 is generated. In this instance, when the first unit cell C1 is bypassed by opening of the first bypass fuse BF1, the internal temperature of the first unit cell C1 falls, and the first bypass switch BR1 has relatively high resistance. Accordingly, the charging current (②) is reduced and the charging of the other unit cells (C2 to C4) are delayed or slowed.

When the third unit cell C3 is overcharged in this state, the second bypass fuse BF2 is opened by the second and third bypass switches BR2 and BR3, and when the fourth unit cell C4 is overcharged, the third and fourth bypass fuses BF3 and BF4 are opened by the third and fourth bypass switches BR3 and BR4.

As described, when the first to fourth bypass fuses (BF1 to BF4) are opened such that the charging path includes no unit cell, the charging of the battery module 10 is stopped. By this, when the main fuse 30 has a defect, or when the control of the battery controller 40 fails, the phenomenon of causing fire by a continuous overcharging of the battery module 10 may be prevented.

Figure 4:
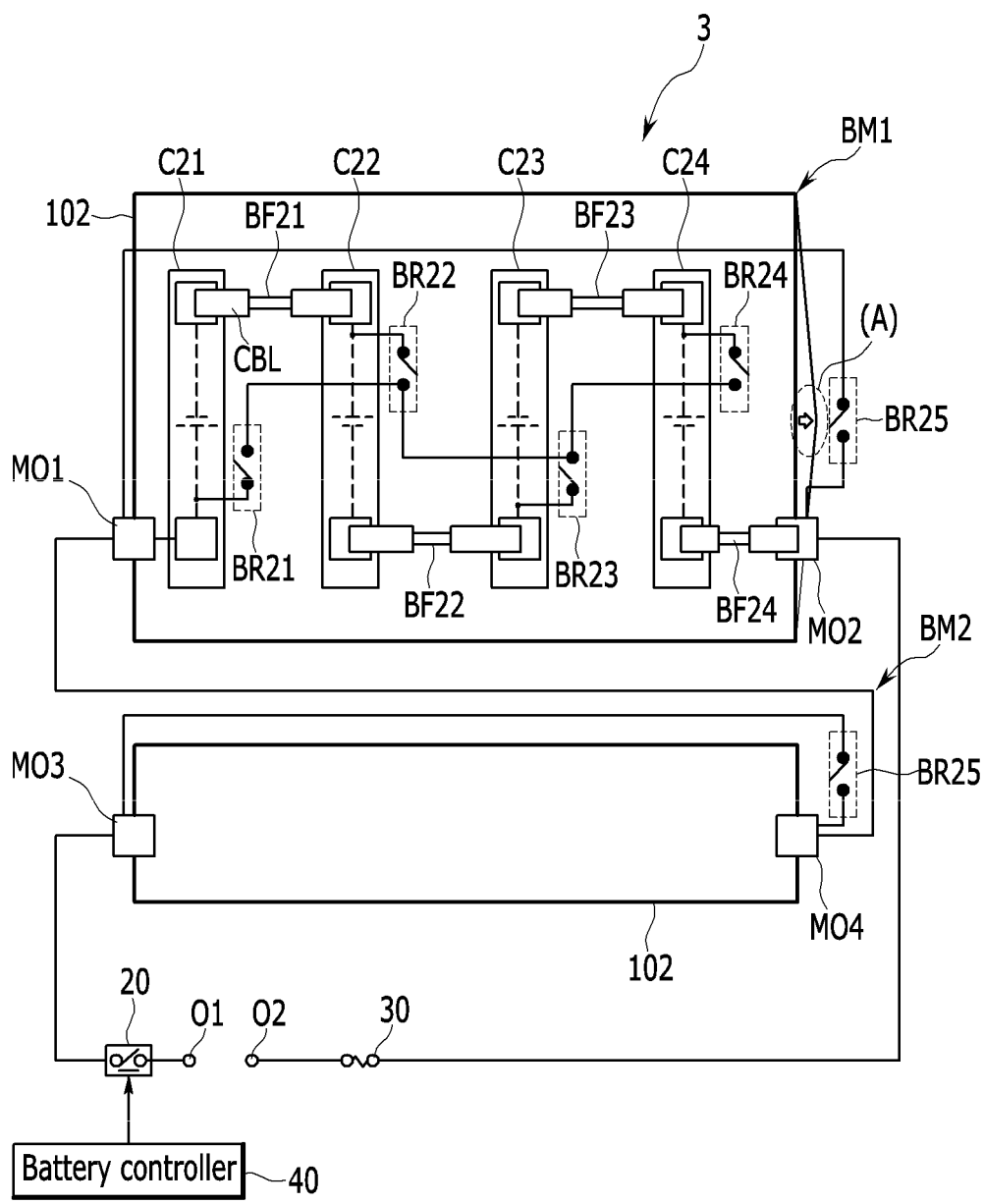
FIG. 4 shows a circuit diagram of a device for protecting a rechargeable battery according to a second embodiment.

FIG. 4 shows a circuit diagram of a device for protecting a rechargeable battery according to a second embodiment.

Referring to FIG. 4, the device for protecting a rechargeable battery 3 includes first and second battery modules BM1 and BM2, a main relay 20, a main fuse 30, and a battery controller 40. A configuration and a connection relationship of the main relay 20, the main fuse 30, the battery controller 40, the external positive terminal O1, the external negative terminal O2, the module positive terminal MO1, and the module negative terminal MO2 correspond to those of FIG. 1, like reference numerals are used, and repeated description is omitted.

The positive terminal MO1 of the first battery module BM1 is connected to a negative terminal MO4 of the second battery module BM2, and a positive terminal MO3 of the second battery module BM2 is connected to the external positive terminal O1 through the main relay 20. The negative terminal MO2 of the first battery module BM1 is connected to the external negative terminal O2 through the main fuse 30.

The first battery module BM1 includes first to fourth unit cells (C21 to C24) and a protection device received in the module case 102. The first to fourth unit cells (C21 to C24) correspond to the first to fourth unit cells (C1 to C4) of FIG. 1, and repeated description thereof is omitted. The configuration of the second battery module BM2 corresponds to that of the first battery module BM1, and repeated description thereof is omitted. A protection device that is different from the first embodiment will now be described in detail.

A protection device according to a second embodiment includes first to fifth bypass switches (BR21 to BR25) and first to fourth bypass fuses (BF21 to BF24). The first bypass switch BR21 is disposed on the first unit cell C21, and when the internal pressure increases by an overcharging of the first unit cell C21, an electrical wire/connection between the positive terminal of the first unit cell C21 and the second bypass switch BR22 is generated.

The second bypass switch BR22 is located on the second unit cell C22, and when the internal pressure increases by an overcharging of the second unit cell C22, an electrical wire/connection between the positive terminal of the second unit cell C22 and the third bypass switch BR23 is generated. Similarly, the third bypass switch BR23 is disposed on the third unit cell C23, and when the internal pressure increases by an overcharging of the third unit cell C23, an electrical wire/connection between the positive terminal of the third unit cell C23 and the fourth bypass switch BR24 is generated.

The fourth bypass switch BR24 is disposed on the fourth unit cell C24, and when the internal pressure increases by an overcharging of the fourth unit cell C24, an electrical wire/connection between the third bypass switch BR23 and the positive terminal of the fourth unit cell C24 is generated. The fifth bypass switch BR25 is located on the first battery module BM1, and when the internal pressure of the first battery module BM1 increases by an overcharging of one or more of the first to fourth unit cells (C21 to C24), an electrical wire/connection between the module positive terminal MO1 and the module negative terminal MO2 is generated.

Here, the fifth bypass switch BR25 forms an electrical node/connection with the module positive terminal MO1 and the module negative terminal MO2 when the internal pressure of the first battery module BM1 increases to cause the module case 102 to expand, as shown by (A). That is, the fifth bypass switch BR25 has the same configuration as the first to fourth bypass switches (BR21 to BR24) except that the electrical node is generated not by the case of the unit cell, but instead by the expansion of the module case.

As described, when the internal pressure of the first battery module BM1 increases, the fifth bypass switch BR25 according to a second embodiment electrically connects the bypass path among the first to fourth unit cells (C1 to C4), the module positive terminal MO1, and the module negative terminal MO2 so that it may be operable as a bypass switch for bypassing the first battery module BM1.

The present embodiment exemplifies the case in which the bypass switch forms an electrical node with the positive terminal of the unit cell, but the present embodiment is not restricted thereto, and the bypass switch may form an electrical node with the negative terminal of the unit cell instead of the positive terminal of the unit cell. In this case, the bypass fuse may be between the positive terminal of the first unit cell and the module positive terminal instead of being between the negative terminal of the last unit cell and the module negative terminal.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A device for protecting a rechargeable battery comprising:
    a plurality of unit cells contained in a module case and coupled in series between a first module electrode terminal and a second module electrode terminal;
    a plurality of bypass switches separated from the plurality of unit cells, electrically connected to each other, having a portion thereof physically contacting a first electrode terminal of a respective one of the unit cells, and configured to close according to an internal pressure of the respective one of the unit cells; and
    a plurality of bypass fuses for connecting adjacent ones of the plurality of unit cells, and for connecting a last unit cell of the plurality of unit cells and the second module electrode terminal, respectively.

2. The device for protecting a rechargeable battery of claim 1, wherein the plurality of unit cells respectively comprise:
    a battery assembly;
    the first electrode terminal connected to a first electrode of the battery assembly;
    a second electrode terminal connected to a second electrode of the battery assembly; and
    a case for receiving the battery assembly.

3. The device of claim 2, wherein the plurality of bypass switches respectively comprise:
    a first connector on the case, having a same polarity as the first electrode terminal, and configured to be physically transformed according to an internal pressure of the case;
    a second connector configured to form an electrical connection with the first connector, and having resistance that is configured to vary according to an internal temperature of the case; and
    a third connector for connecting the second connector to an adjacent bypass switch.

4. The device of claim 3, wherein the second connector comprises an element of which resistance is configured to decrease when the internal temperature rises, and is configured to increase when the internal temperature falls.

5. The device of claim 3, wherein the third connector of the bypass switch corresponding to the last unit cell from among the plurality of bypass switches is connected to the second module electrode terminal.

6. The device of claim 1, wherein the plurality of bypass switches are configured to respectively electrically connect the first electrode terminals of two of the unit cells according to the internal pressures of the two of the unit cells to form an electrical connection.

7. The device of claim 6, wherein the plurality of bypass fuses are configured to be respectively opened by a current due to the electrical connection.

8. The device of claim 1, further comprising a bypass switch configured to be transformed according to an internal pressure of the module case to generate an electrical connection between the first and second module electrode terminals.

* * * * *